United States Patent [19]
Dela

[11] Patent Number: 5,277,250
[45] Date of Patent: Jan. 11, 1994

[54] INJECTOR QUILL

[75] Inventor: Steven A. Dela, Westminster, Calif.

[73] Assignee: Nalco Chemical Company, Naperville, Ill.

[21] Appl. No.: 929,110

[22] Filed: Sep. 30, 1992

[51] Int. Cl.$^5$ ............................................. F21B 43/00
[52] U.S. Cl. ..................................... 166/90; 166/305.1
[58] Field of Search ............... 166/90, 91, 305.1, 268, 166/271, 260, 261

[56] References Cited

U.S. PATENT DOCUMENTS

| | | | |
|---|---|---|---|
| 3,700,031 | 10/1972 | Germer, Jr. et al. | 166/305.1 X |
| 4,821,799 | 4/1989 | Wong | 166/90 X |
| 5,133,625 | 7/1992 | Albergo et al. | 166/305.1 X |
| 5,209,301 | 5/1993 | Ayres | 166/90 X |

Primary Examiner—Thuy M. Bui
Attorney, Agent, or Firm—Kinzer, Plyer, Dorn, McEachran & Jambor

[57] ABSTRACT

Injector for injecting a liquid treatment chemical into a moving body of liquid in a pipe and comprising an elongated hollow quill member having a stem portion of a length to span substantially the inside diameter of the pipe; and said stem being provided along substantially its entire length with a substantially uniform set of jet openings for injecting the cross-section of the body of liquid with a multiplicity of chemical treatment jet streams so that the cross section of the body of liquid will be treated equally across its diametrical cross section.

10 Claims, 2 Drawing Sheets

INJECTOR QUILL

This invention relates to an injector quill for distributing a treatment fluid into a confined fluid body. One prominent application is to inject pipeline petroleum products with an amine to scavenge hydrogen sulfide, $H_2S$.

BACKGROUND OF THE INVENTION

It is current practice to employ an injector quill to inject pipeline petroleum with different chemicals: $H_2S$ scavengers, pH controls, anti-foulants and emulsion breakers, as examples. There are other applications as well.

The current quill employed commercially incorporates a nozzle outlet, centered in the pipeline or other conduit. As a consequence, treatment is concentrated in the area around the centerline of the moving stream. The primary object of the present invention is to construct a quill which will account for uniform treatment, even saturation, of the entire cross section of the body of liquid which is to be treated.

SUMMARY OF THE INVENTION

Instead of a quill having a working end terminating in a nozzle emitting a single stream of the treating agent, the quill stem of the present invention is of uniform diameter with staggered jet openings along the length, each opening serving to pass the treating agent into the body of fluid to be treated. Therefore, under the present invention, the cross section of the body of fluid is uniformly treated.

THE DRAWING

GENERAL STATEMENT

Figure 1:
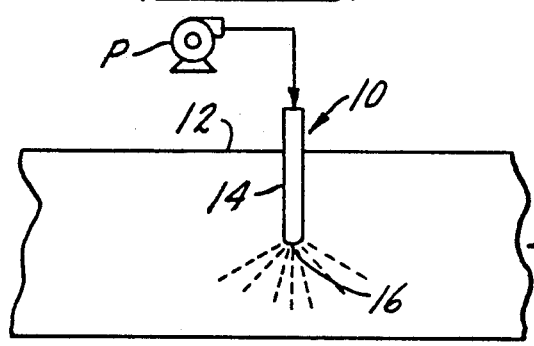
FIG. 1 is a diagram of the prior art practice.

FIG. 1 is a diagram of a typical quill installation associated with a pipeline or other transport pipe. The quill body 10 is coupled by flow communication to a pump P which feeds a treatment chemical to the quill. The quill is threaded to the receiving valve (not shown) of pipeline 12 and has a stem 14 terminating in an outlet end 16 which injects the stream of fluid ("FLOW") with the treating agent. The locale of the injected treating agent is denoted by dashed lines. It can be seen the treatment is confined generally to the center line of the moving stream of fluid.

Figure 2:
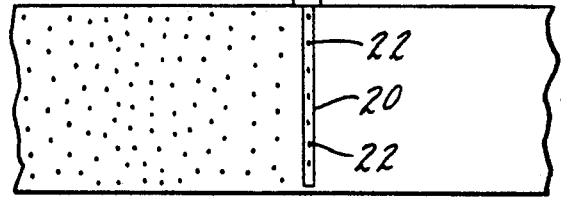
FIG. 2 is a diagram of practice under the present invention.

Under the present invention, the quill assembly embodies a stem 20, FIG. 2, having several staggered rows of jet openings 22 by which the treating agent is spread mist-like and uniformly throughout the cross section of the body of fluid so treated, denoted by dots in FIG. 2.

DETAILED DESCRIPTION

Figure 3:
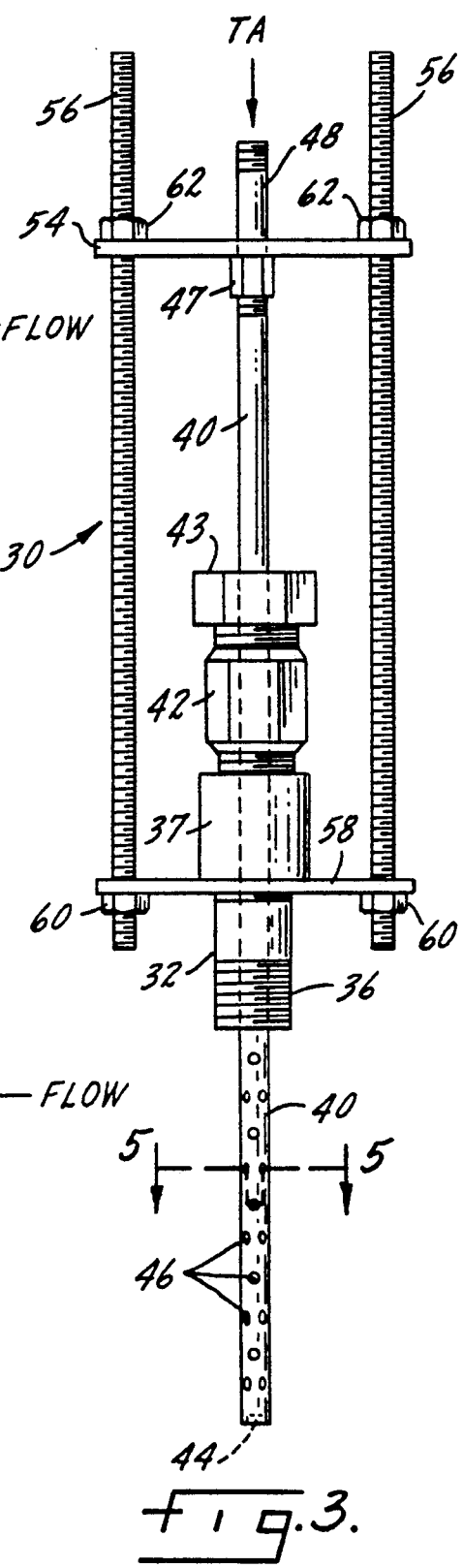
FIG. 3 is an elevation of the quill member of the present invention.

A quill body or assembly is shown at 30 in FIG. 3. The construction is known except for the form of quill stem to be described. The quill assembly includes a nipple 32 having a threaded lower end 36 so the quill assembly can be threadedly connected to the valve (not shown) of the pipeline. Thus, the quill assembly is to be fixed to the pipeline.

The quill member or assembly 30 has a hollow, elongated stem 40 of reduced diameter compared to nipple 32. The stem 40 extends through nipple 32, through a collar 37 and through a packing gland 42 having a union 43.

The extended or projected length of the elongated stem 40 (below or beyond the nipple 32) is such as to extend through the aforementioned valve and into the cross section of the pipe with which it is to be used. The lower end of the quill stem is closed by a removable plug or cap, preferably a hex head set screw 44 which can be removed to clean the inside of the quill stem.

The projected, lower free end portion of the quill stem has (preferably) three staggered rows of drilled jet openings 46 uniformly spaced along its length and part way about its circumference for passing the treating agent into the pipeline in the form shown in FIG. 2.

The upper end of the quill stem 40 is coupled to a union 47 which in turn couples to a nipple 48. The nipple 48 communicates with the feed line of a pump as P, FIG. 1, by which the treating agent (TA, FIG. 3) is fed forcefully to the quill. Because of the numerous staggered openings 46 in the quill stem, the treating agent will be distributed substantially uniformly and equally across the diametrical cross section of the body of fluid to be treated; see FIG. 2.

Positioned above the union 47 and resting on it is a draw plate 54. The draw plate 54 has openings mated to a pair of threaded guide rods 56 parallel to and on opposite sides of the draw plate. The lower ends of the guide rods are inserted in openings in a stop plate 58 resting on lock nuts 60 threaded to the lower ends of the rods 56.

The draw plate is held against the union 47 by a pair of adjusting nuts 62 at the upper ends of the guides 56. By backing off union 43, and then by tightening the nuts 62, the draw plate 54 is forced downward against the union 47 and this action in turn extends the quill stem 40 to fit a transport pipe of large diameter. Conversely, the draw plate 54 can be retracted by retracting nuts 62, allowing the quill to be retracted by hand for a pipe of smaller diameter.

The pump to be employed is preferably a metering pump. The quill assembly is of such size and capacity as to feed to the pipeline as much as 100 gallons of treating agent per hour or as little as 5 gallons per hour.

Figure 4:
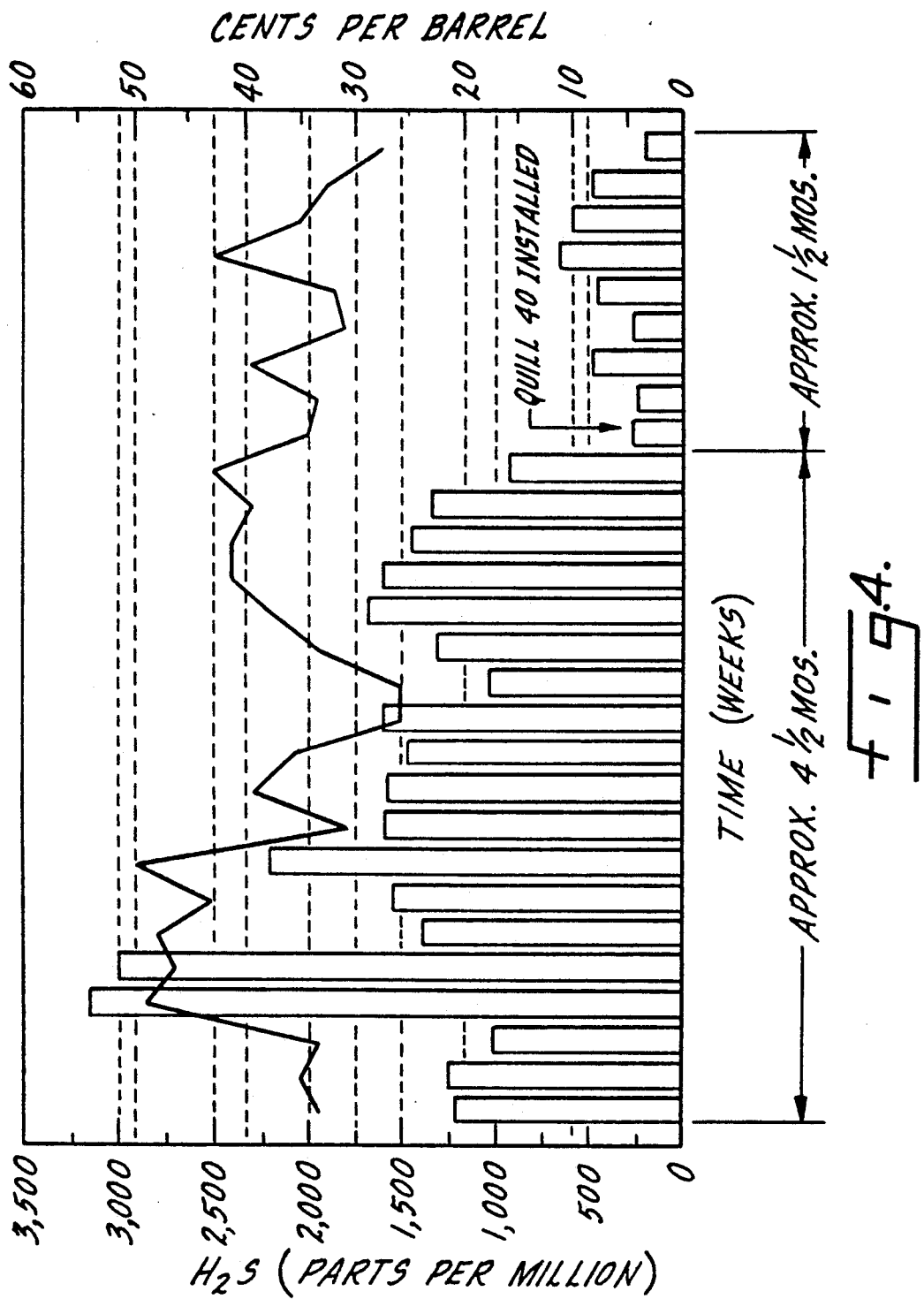
FIG. 4 is a performance chart.

Improved performance is shown by the chart, FIG. 4. The treatment was a chemical to combat $H_2S$ in a petroleum pipeline. The vertical bars show treatment costs during the 4½ month term when a standard treating agent was added by the known quill, the one having an injector nozzle end as explained in connection with FIG. 1. The cost figures are cents per barrel (bb) of chemical treating agent (TA) based on the volume of hydrocarbon (HC) treated, expressed as cost TA/bb HC. In FIG. 4, the continuous solid line represents the $H_2S$ level in the hydrocarbon stream before any treatment.

An inventory of quills (all preferably ¼" diameter) can be maintained, such as one group having openings 46 along an axis four inches in length (small transport pipe) and a second group having openings 46 along an axis eight inches in length for larger transport pipes.

The quill can be used in any application where a chemical can be or is applied to a liquid stream, whether a hydrocarbon based or water based stream, provided of course there is a sufficient flow rate to promote distribution of the treating agent.

It may be emphasized that orientation of the quill stem in the process stream to be treated is of considerable importance under and in accordance with the present invention. This explains why three rows of openings 46 are employed rather than four as might be expected.

Figure 5:
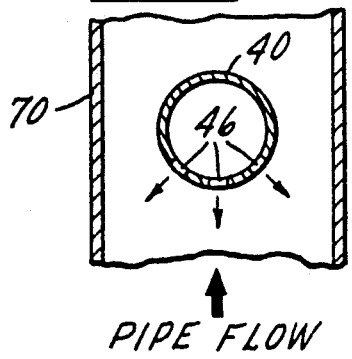
FIG. 5 is a sectional view on the line 5—5 of FIG. 3.

Attention is now directed to FIG. 5 where the bold arrow ("PIPE FLOW") indicates the direction of flow of the process stream in which the quill stem 40 is immersed. The quill stem is shown in section. The quill stem is oriented so the jet openings face in the direction of flow inside the pipe 70, emitting the treating fluid in jet streams (smaller arrows) opposed to the pipe flow. Note the three rows of openings 46 are (preferably) 45° apart in terms of the circumference of the quill stem.

Using three rows of openings instead of four has to do with flow velocities of the treated stream, FIG. 5, and achieving maximum dispersion of the chemical being injected.

If four rows were used, with the fourth row located opposite the first row, no greater dispersion of chemical would be achieved. The two offset rows are not arranged perpendicular (not 90°) to the axis of the quill. This is because of the turbulence around the stationary quill. The quill is oriented so the rows of holes are facing into the flow of the treated stream, and FIG. 5 shows how the injected stream would look from an overhead view.

I have experimented with the angle of the two offset rows and have found that 45 to 60 degrees offset is optimal, depending on the flow velocity of the treated stream. The higher the velocity, the more the angle needs to approach the 45 degree angle. Again, it is possible to maintain an inventory of stems of different "offset."

Hence, while I have illustrated and described the preferred embodiment of the present invention, it is to be understood that this is capable of variation and modification.

I claim:

1. Injector for injecting a liquid treatment chemical into a moving body of liquid within a transport pipe and comprising:

an elongated hollow quill stem of a length to span substantially the inside diameter of the pipe;

said stem having a closed lower end and being provided along its length with several rows of jet openings for injecting the cross-section of the body of liquid with a multiplicity of chemical treatment jet streams so that the cross section of the body of liquid will be treated substantially equally across its diametrical cross section;

and said quill having an upper open end to receive the chemical treatment.

2. Injector according to claim 1 in which the quill is adjustably supported so that the quill stem can be extended and retracted to fit transport pipes of different diameter.

3. Injector according to claim 1 in which there are three rows of substantially uniformly spaced jet openings, the rows being off-set from one another within the limit of about 45°-60° measured about the circumference of the quill stem.

4. Injector according to claim 1 in which the lower end of the quill stem is closed by a removable plug.

5. Injector according to claim 1 in which the quill is adjustably supported so that the quill stem can be extended and retracted to fit transport pipes of different diameter, in which there are three rows of substantially uniformly spaced jet openings, the rows being offset from one another within the limit of about 45°-60° measured about the circumference of the quill stem and in which the lower end of the quill stem is closed by a removable plug.

6. Injector system attached to a transport pipe for injecting a liquid treatment chemical into a moving body of liquid within the transport pipe and comprising:

an elongated hollow quill stem of a length to span substantially the inside diameter of the pipe;

said stem having a closed lower end and being provided along its length with several rows of substantially uniformly spaced jet openings for injecting the cross-section of the body of liquid with a multiplicity of chemical treatment jet streams so that the cross-section of the body of liquid will be treated equally across its diametrical cross section;

said quill being oriented so the rows of jet openings inject the chemical treating agent in jet streams opposed to the direction of flow of liquid in the pipe;

and said quill having an upper open end to receive the chemical treatment.

7. Injector system according to claim 6 in which the quill is adjustably supported so that the quill can be extended and retracted to fit transport pipes of different diameter.

8. Injector system according to claim 6 in which the lower end of the quill stem is closed by a removable plug.

9. Injector system according to claim 6 in which there are three rows of substantially uniformly spaced jet openings, the rows being off-set from one another within the limit of about 45°-60° measured about the circumference of quill stem.

10. Injector system according to claim 6 in which the quill is adjustably supported so that the quill stem can be extended and retracted to fit transport pipes of different diameter, in which there are three rows of substantially uniformly spaced jet openings, the rows being off-set from one another within the limit of about 45°-60° measured about the circumference of quill stem and in which the lower end of the quill stem is closed by a removable plug.

* * * * *